United States Patent

Wang

[11] Patent Number: 5,986,808
[45] Date of Patent: Nov. 16, 1999

[54] SURFACE-PLASMON-WAVE-COUPLED TUNABLE FILTER

[75] Inventor: Yu Wang, La Crescenta, Calif.

[73] Assignee: California Institute of Technology, Pasadena, Calif.

[21] Appl. No.: 08/949,151

[22] Filed: Oct. 10, 1997

Related U.S. Application Data

[60] Provisional application No. 60/027,336, Oct. 11, 1996.

[51] Int. Cl.$^6$ ........................................ G02B 1/10
[52] U.S. Cl. .................... 359/585; 359/578; 359/579; 349/106; 349/196
[58] Field of Search .................. 345/88; 348/744; 349/105, 106, 196; 359/578, 579, 585

[56] References Cited

U.S. PATENT DOCUMENTS

| | | | |
|---|---|---|---|
| 5,451,980 | 9/1995 | Simon et al. | 345/88 |
| 5,570,139 | 10/1996 | Wang | 348/744 |

FOREIGN PATENT DOCUMENTS

| | | | |
|---|---|---|---|
| 0 565 261 A1 | 10/1993 | European Pat. Off. | G01J 3/26 |

OTHER PUBLICATIONS

Sartor, Mark, et al., "Intensified multispectral imaging using tunable filtering," SPIE Proceedings Oct. 22–Oct. 28, 1995 Philadelphia, PA, vol. 2599, pp. 273–284, Jan. 1996.

Wang, Yu, "Voltage–induced color selective absorption with surface plasmons," *Appl. Phys. Lett.*, vol. 67, No. 19, pp. 2759–2761, Nov. 6, 1995.

Hoyt, Clifford C., "Towards Higher Res, Lower Cost Quality Color and Multispectral Imaging," *Advanced Imaging*, pp. 53–55, Apr. 1995.

Welford, K.R., et al., "Coupled surface plasmons in a symmetric system," *Journal of Modern Optics*, vol. 35, No. 9, pp. 1467–1483, 1988.

*Primary Examiner*—Cassandra Spyrou
*Assistant Examiner*—Craig Curtis
*Attorney, Agent, or Firm*—Fish & Richardson P.C.

[57] ABSTRACT

A surface plasmon filter having two symmetric metal-dielectric interfaces coupled with each other to produce a transmission optical wave at a surface plasmon resonance wavelength at one interface from a p-polarized input beam on the other interface.

20 Claims, 7 Drawing Sheets

SURFACE-PLASMON-WAVE-COUPLED TUNABLE FILTER

This application claims the benefit of the U.S. Provisional Application No. 60/027,336, filed on Oct. 11, 1996, the disclosure of which is incorporated herein by reference in its entirety.

ORIGIN OF THE INVENTION

The invention described herein was made in the performance of work under a NASA contract, and is subject to the provisions of Public Law 96-517 (35 U.S.C. 202) in which the Contractor has elected to retain title.

FIELD OF THE INVENTION

The present invention relates to wavelength tunable optical filters, and more particularly, to a surface plasmon tunable filter.

BACKGROUND OF THE INVENTION

An optical wavelength filter reflects or transmits light of a desired wavelength or within a certain wavelength range. An interference bandpass filter, for example, selectively transmits light within a selected wavelength transmission bandwidth while absorbing light of wavelengths outside the transmission bandwidth. Such optical filtering with respect to wavelength provides a means of controlling the energy and spectral composition of light and is widely used in a variety of optical signal processing, detection, and display applications.

Excitation of surface plasmon waves at a metal-dielectric interface has been demonstrated as an efficient way of implementing a spectral filtering mechanism in response to an electrical control signal. See, for example, Wang and Simon, "Electronic Reflection with Surface Plasmon," Opt. Quantum Electron.25, S925 (1993) and Wang, "Voltage-Induced Color-Selective Absorption with Surface Plasmon", Appl. Phys. Lett. 67, pp. 2759–2761 (1995). Surface plasmon are oscillations of free electrons caused by resonant absorption of a p-polarized incident optical wave at a metal-dielectric interface when the wavelength and incident angle of the optical wave satisfy a plasmon resonance condition. More specifically, the plasmon resonance condition requires that the component of the optical wave vector along the metal-dielectric interface matches the plasmon wave vector, $K_p$:

$$K_p = \frac{2\pi}{\lambda} \sqrt{\frac{\epsilon_1 \epsilon_2}{\epsilon_1 + \epsilon_2}}, \quad (1)$$

where, $\lambda$ is the wavelength of the optical wave, $\epsilon_1$ and $\epsilon_2$ are the dielectric permittivity constants for the metal and the dielectric material, respectively.

At surface plasmon resonance, the energy of the incident optical wave is strongly absorbed and converted into the energy of oscillating free electrons in the metal. Therefore, the reflected optical wave is strongly attenuated or even vanishes. When the incident angle of the optical wave is fixed at a constant, the optical wavelength $\lambda$ satisfying the plasmon resonance condition may be changed by varying the dielectric permittivity constant $\epsilon_2$ of the dielectric material. If the input optical wave is white light, the color of the reflected optical wave will change with $\epsilon_2$. This phenomena effects a surface plasmon tunable filter in reflection mode.

Therefore, an electronically tunable filter can be formed by using an electro-optic material as the dielectric material. The voltage applied on the electro-optic material changes its index of refraction and thereby changes the wavelength for the surface plasmon resonance.

Wang and Simon disclose color display devices based on a surface plasmon filter using a liquid crystal electro-optic material. U.S. Pat. Nos. 5,451,980 and 5,570,139. The index of the refraction of the liquid crystal is changed by applying a voltage to alter the spectral composition of the reflected light.

SUMMARY OF THE INVENTION

The present invention uses surface plasmon waves at metal-dielectric interfaces to alter the spectral composition of light having a p-polarized component. The metal material in general has a negative dielectric constant and the dielectric material has a positive dielectric constant. The electrical field of the p-polarized component at non-normal incidence induces electric dipoles in a metallic layer that forms one side of a metal-dielectric interface due to the excitation of the free electrons in the metal. The direction of the induced dipoles is perpendicular to the metal-dielectric interface. The radiation of the dipoles generates a surface plasmon wave with a wave vector parallel to the interface. The strength of the surface plasmon wave is maximal at the metal-dielectric interface and decays exponentially on both sides of the interface.

The energy conversion from the incident light to the surface plasmon wave is maximal when the incident angle, wavelength of the incident light, the dielectric constants of the metal and the dielectric materials satisfy a surface plasmon resonance condition. In general, this resonance condition relates to mode matching between the p-polarized incident light and the surface plasmon wave at a metal-dielectric interface and may vary with the specific incident coupling mechanism and the structure of the interfaces (e.g., a single interface or two closed coupled interfaces).

One embodiment of the invention includes a dielectric layer sandwiched between two metallic layers to form two closely spaced symmetrical metal-dielectric interfaces. The optical thickness of the dielectric layer is configured to allow for excitation of surface plasmon waves on both metal-dielectric interfaces by an input optical wave. The dielectric layer may be less or larger than one wavelength but in general on the order of a wavelength. The coupling between the surface plasmon waves produces a reflected wave and a transmitted wave that have mutually complimentary colors.

One aspect of the invention is tuning the surface plasmon resonance frequency by adjusting the optical thickness of the dielectric layer. Either the thickness or the index of the refraction of the dielectric layer may be adjusted to change the transmission wavelength. One implementation uses an adjustable air gap as the dielectric layer. Another implementation uses a layer of an electro-optic material to vary the optical thickness by changing the index of refraction with a voltage control signal.

The surface plasmon filter may also be used to form other devices. One such device is a tunable high-resolution spectrometer which can be formed by combining the surface plasmon filter with a Fabry-Perot filter. Another such device is a spectrometer-on-a-chip in which a surface plasmon filter is integrated with a sensor array on a single chip. Furthermore, a color LCD display can be formed with a surface plasmon filter.

The surface plasmon filter may be configured to have a large tunable range and bandwidth, a simple structure, and light weight. In addition, an air-gap surface plasmon filter can operate under a wide range of temperatures.

These and other aspects and advantages of the present invention will become more apparent in light of the following detailed description, the accompanying drawings, and the claims.

DETAILED DESCRIPTION OF THE INVENTION

Figure 1B:
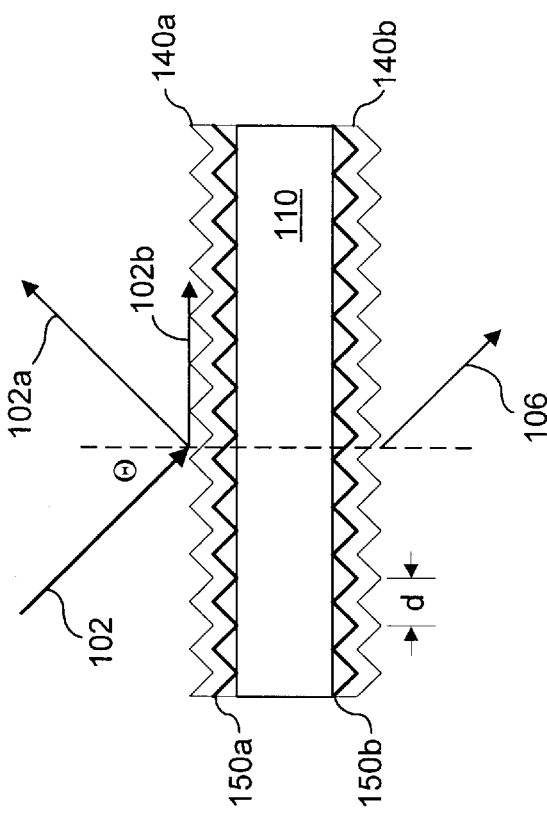
FIG. 1B is a diagram showing another embodiment of the surface plasmon filter using a grating for light coupling.
Figure 1A:
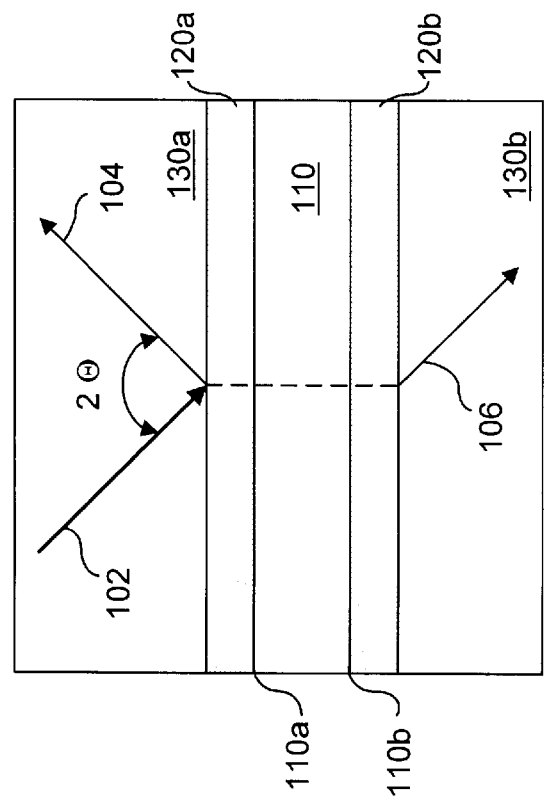
FIG. 1A is a diagram showing one embodiment of the surface plasmon filter using a high-index material for light coupling.

FIG. 1A shows one embodiment 100 of a coupled surface plasmon tunable filter. Two symmetrical metal-dielectric interfaces 110a and 110b are formed by sandwiching a dielectric layer 110 between two substantially identical metallic layers 120a and 120b. The metallic layers 120a and 120b are sufficiently thin so that the evanescent electromagnetic waves can penetrate the metallic layers 120a and 120b. The evanescent waves may be generated by, for example, an incident optical wave or coupling of oscillating electrical fields caused by surface plasmon waves. In general, the thickness of the metallic layers 120a and 120b may be any value. However, the preferred thickness is from about 5 nm to about 150 nm and most preferably from about 10 nm to about 100 nm. A variety of metals may be used for forming the layers 120a and 120b, including but not limited to, Ag, Al, Au, K, and Li.

The dielectric layer 110 may be any dielectric material, including air or an electro-optic material including inorganic crystals (e.g., KDP, KTP, LiNbO$_4$), polymide guest-host materials, organic crystals (e.g., MMONS and MNA), organic salts, and liquid crystals. The thickness of the dielectric layer 110 is sufficiently thin to allow for efficient energy coupling between the first metallic-dielectric interface 110a and the second metallic-dielectric interface 110b. Preferably, the optical thickness of the dielectric layer 110 is on the order of a wavelength.

An incident optical wave 102 to the metallic layer 120a can excite a surface plasmon wave at the first interface 110a if the surface plasmon resonance condition is met. The energy of photons in the surface plasmon resonance is converted into collective oscillations of free electrons generated in the first metallic layer 120a. This causes strong absorption of the photons at the resonant wavelength in the incident optical wave 102 and the unabsorbed photons are reflected as the reflected wave 104 from the first metallic layer 120a.

The oscillating free electrons in the first metallic layer 120a generate an evanescent optical wave at the wavelength of the absorbed resonant photons. The field of the evanescent optical wave penetrates the thin dielectric layer 110 to reach the second metallic-dielectric interface 110b. The field of the evanescent optical wave can excite a second surface plasmon wave on the second interface 110b. This is at least in part due to the symmetry of the two interfaces 110a and 110b with respect to the dielectric layer 110. The second surface plasmon wave is substantially identical to the first surface plasmon wave including the frequency and the plasmon wave vector. The oscillating free electrons in the second metallic layer 120b radiate photons in the same direction and at the same frequency as the absorbed resonant photons at the first metallic layer 120a. The radiated photons exit the second metallic layer 120b as a transmitted wave 106 which is substantially parallel to the input beam 102.

Therefore, for an incident light with a broad spectrum, the device 100 of FIG. 1 will couple the spectral component that satisfies the surface plasmon resonance condition to the second interface 110b as the transmitted wave 106 and reflects the rest of the input light as the reflected wave 104. In particular, a white input beam may be split into a colored transmitted beam and a reflected beam which is spectrally complimentary to the transmitted beam.

The excitation of the first surface plasmon wave at the first interface 110a and the excitation of the second plasmon wave at the second interface 110b are correlated. Under a surface plasmon resonance condition, the evanescent field pattern of the first surface plasmon wave in the dielectric layer 110 and the evanescent field pattern of the second surface plasmon wave affect each other to match the field patterns. The incident angle and wavelength of the incident optical wave 102 and the optical thickness of the dielectric layer 110 can be adjusted to satisfy the resonance condition in order to achieve simultaneous excitation of both the first and the second plasmon waves. The exact resonance condition can be determined by applying the Maxwell wave equations to each of the dielectric layer 110 and the two metallic layers 120a and 120b and by matching the boundary conditions at interfaces 110a and 110b.

For a given incident angle of the input optical wave 102, the optical thickness of the dielectric layer 110 may be adjusted to achieve excitation of the surface plasmon waves at different wavelengths to effect color filtering in both transmitted beam 108 and the reflected beam 104. The optical thickness of the dielectric layer 110 is the product of its index of refraction and the layer thickness. Therefore, the thickness of the dielectric layer 110, or the index of refraction, or both may be varied in order to select different wavelengths to meet the resonance condition of surface plasmon waves at the interfaces 110a and 110b.

Referring to FIG. 1, the embodiment 100 further includes two identical dielectric layers 130a and 130b respectively formed on the metallic layers 120a and 120b. The index of the refraction of the layers 130a and 130b is larger than that of the dielectric layer 110 in order to properly couple the input optical beam 102 to excite surface plasmon waves. For example, a high-index prism (e.g., $TiO_2$) may be used to couple the input optical wave 102 at a specified incident angle. In general, the incident angle of the input optical wave 102 is larger than the critical angle for total reflection defined the high-index layer 130a (or 130b) and the dielectric layer 110.

The coupling dielectric layers 130a and 130b are usually in form of prisms and may be made of any dielectric material with an index higher than the dielectric layer 110. Examples of suitable high-index materials include glasses such as SF glass (e.g., SF6, SF57, SF 58, SF 59, etc.) and LaSF glasses (e.g., LaSFN18, LaSFN31, LasFN9, LaSF13, etc.), crystals such as $TiO_2$, sapphire, diamond, and high-index polymers.

Alternatively, a grating may also be used for light coupling as shown in FIG. 1B. In this embodiment, two substantially identical gratings 140a and 140b substitute the high-index coupling dielectric layers (130a and 130b). Each of the gratings 140a and 140b is coated with a layer of metal film (150a and 150b) to form the metal-dielectric interfaces. The gratings 140a and 140b are configured to produce a diffracted order 102b of the incident light 102 to have a wave vector parallel to the metal-dielectric interfaces. For example, the first-order diffraction beam may be used as the beam 102b to excite a surface plasmon wave and the zero-order diffraction beam is reflected as the beam 102a. Similar to the embodiment 100 of FIG. 1A, the coupling between the two symmetric interfaces produces the transmitted beam 106.

In the case where a surface plasmon wave is excited at only one metal-dielectric interface, the resonance condition requires $$\frac{2\pi}{\lambda}\sin\Theta \pm \frac{2\pi}{d} \cdot p = K_p, \quad (2)$$

where d is the grating period, p is an integer indicating the order of diffraction and $K_p$ is the surface plasmon wave vector defined by Equation (1). For the coupled symmetric structure shown in FIG. 1B, the surface plasmon resonance condition is more complex than Equations (2) and can be similarly determined as in the embodiment 100 of FIG. 1A by applying the Maxwell wave equations to each of the dielectric layer 110 and the two metallic layers 150a and 150b and by matching the boundary conditions at interfaces.

The gratings 140a and 140b may be implemented in a number ways. For example, one way is to attach a separately formed grating to the dielectric layer 110; another way is to directly form a coupling grating on the dielectric layer 110; yet another way is to etch a grating on the surface of the dielectric layer. The gratings 140a and 140b in first two examples are preferably made of a transparent material in the operating spectral range. A dielectric material may be used to form a support for the grating coupled filter of FIG. 1B.

Figure 2:
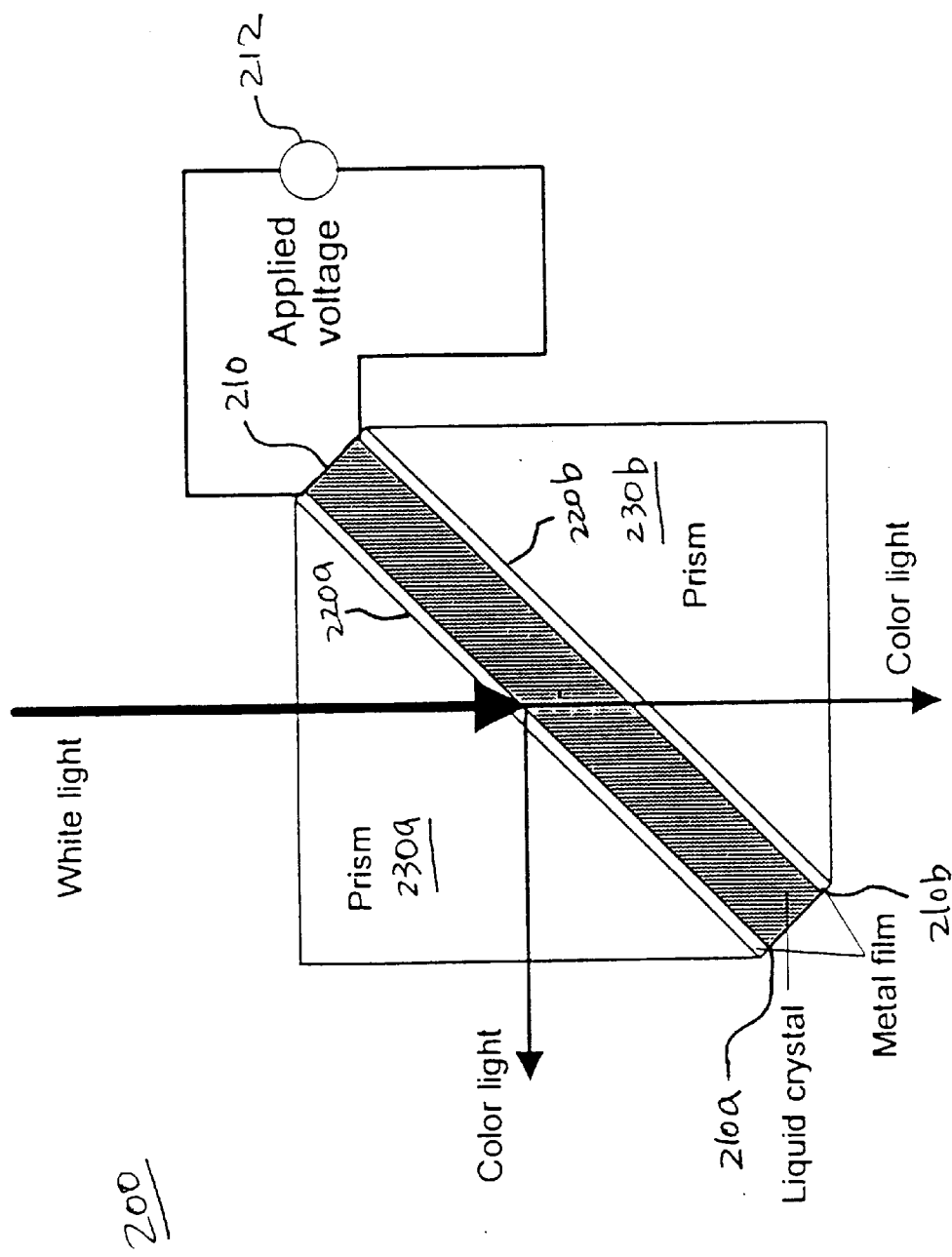
FIG. 2 is diagram showing a surface plasmon filter using a layer of electro-optic material and high-index prisms.

One implementation of the embodiment 100 is shown in FIG. 2. A thin layer of electro-optic material 210 with a fixed thickness less than a wavelength is sandwiched between two thin metallic films 220a and 220b. A first prism 230a is used as an input light coupling element by placing the hypotenuse in contact with the first thin metallic film 220a. Symmetrically, a second prism 230b identical to the 230a is disposed on the second metallic film 220b as an output light coupling element. The index of refraction of the prisms 230a and 230b is larger than that of the electro-optic material 210. An electrical voltage supply 212 is connected to the electro-optic material 210 to provide an electrical control of its index of refraction.

The electro-optic material 210 may be any suitable electro-optic material including KDP, KTP, $LiNbO_4$ crystals or an aligned super-twist nematic liquid crystal. The thin metallic films 220a and 220b may be made of silver, aluminum, or other metals with desired dispersion properties in the surface plasmon excitation. In the visible spectral range, metals such as Ag or Al may be used. In the IR range, Au and alkali metals such as K or Li may be used. The prisms 230a and 230b may be made of a high-index glass as previously described.

The index of refraction of the electro-optic material 210 changes in response to a voltage control signal from source 212. This index change further causes a change in the optical thickness of the electro-optic material 210. Therefore, the surface plasmon resonance frequency and the transmission spectrum of the device 200 change accordingly.

Figure 3A:
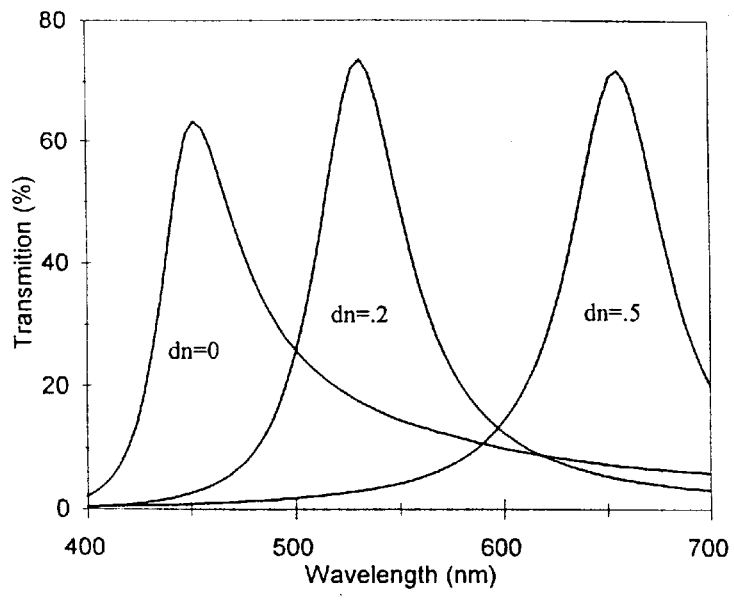
FIG. 3A is a chart of calculated transmission spectrum of the surface plasmon filter of FIG. 2 using silver films under different changes in the index of refraction of the electro-optic layer.

FIG. 3A is a chart showing the calculated transmission spectrum for two silver films separated by a 150-nm electro-optic material layer based on the Maxwell wave equations. The prisms are made of $TiO_2$ and the metallic films 220a and 220b are 35-nm silver films. The incident angle is fixed at 45°. When no voltage is applied, the index change dn is zero, and the peak transmission is about 62% at 450 nm (blue). When the voltage-induced index change of the electro-optic layer is dn=0.2, the transmission peak shifts to 530 nm (green) with a transmission of about 73%. When the index increases by an amount of dn=0.5, the peak transmission shifts to 650 nm (red) with a transmission of about 70%. Thus, all three primary colors (red, green and blue) can be achieved in the transmitted light by changing the index of the electro-optic layer in a range of 0.5.

The intensity and linewidth of a transmission peak in the filter 200 depend on the optical properties and the thickness of the metallic films 220a and 220b. Metals with small imaginary part of the dielectric constant usually lead to higher peak transmission and narrower bandwidth. A thinner metallic layer can be used to achieve greater peak transmission and broader bandwidth.

Figure 3B:
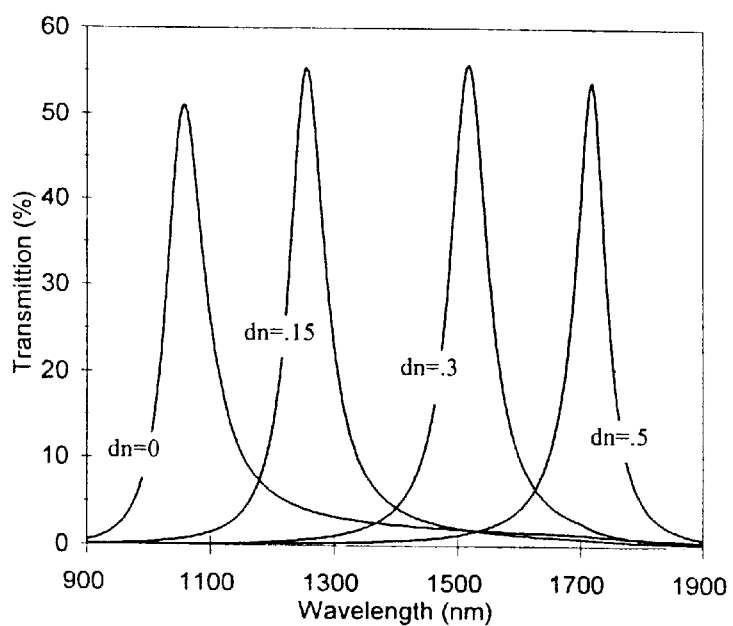
FIG. 3B is a chart of calculated transmission spectrum of the surface plasmon filter of FIG. 2 using potassium films under different changes in the index of refraction of the electro-optic layer.

In addition, different operation spectral ranges may be achieved by using different metals for the metallic films 220a and 220b. For example, potassium films may be used to replace the silver films in the device of FIG. 2 to change the transmission spectrum from the visible range to the infrared (IR) range. FIG. 3B shows that potassium films each of 900 Å are used to achieve a tunable IR spectral range from 1050 nm to 1700 range by varying the index of the electro-optic layer 210 in a range of 0.5, i.e., index varies from 1.5 to 2.0. The coupling prisms are made of $TiO_2$ and the incident angle is about 43°. This particular IR range covers the transmission windows near 1.3 μm and 1.5 μm for fiber communication systems.

Figure 5:
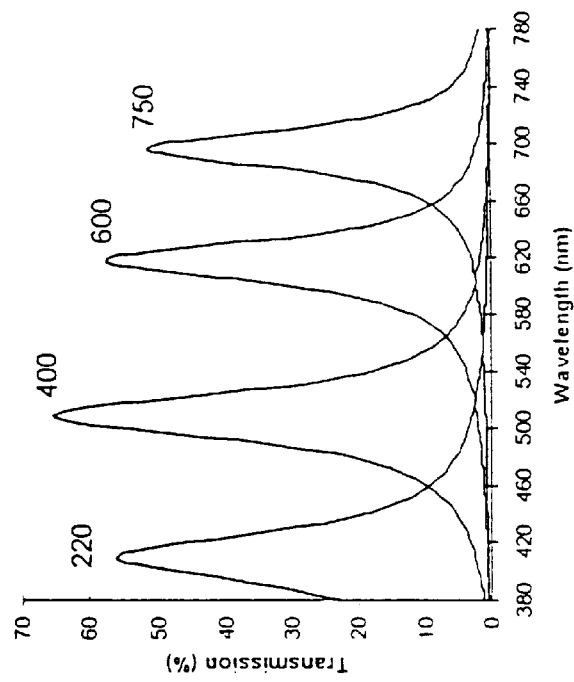
FIG. 5 is a chart of calculated transmission spectrum of the surface plasmon filter of FIG. 4 under different spacings of the air gap.
Figure 4:
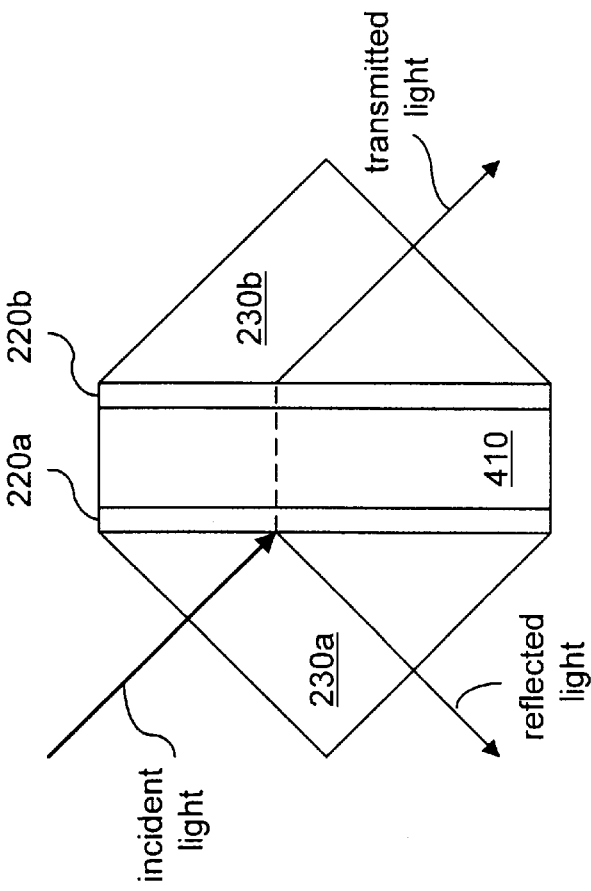
FIG. 4 is diagram showing a surface plasmon filter using an adjustable air gap and high-index prisms.

Another implementation of the embodiment 100 is shown in FIG. 4 which replaces the electro-optic material 210 of FIG. 2 with an adjustable air gap 410 between the two prisms 230a and 230b. In this configuration, the metallic films 220a and 220b are respectively formed on the hypotenuses of the prisms. The metallic-dielectric interfaces along with the surface plasmon waves are excited are metal-air interfaces. The spacing between the metallic films 220a and 220b may be varied by a positioning device such as a piezo-electric transducer. FIG. 5 shows the calculated transmission spectrum of the device of FIG. 4 under different spacings of the air gap 410. The calculation is based on an incident angle of 40°, silver films of 400 Å, and coupling prisms made of the BK7 glass. As the air gap 410 increases from about 200 nm to about 750 nm, the transmission peak shifts from about 400 nm to about 700 nm within the visible spectral range. Transmissions at other spectral ranges may also be achieved, for example, by using different metallic films 220a and 220b.

Figure 6:
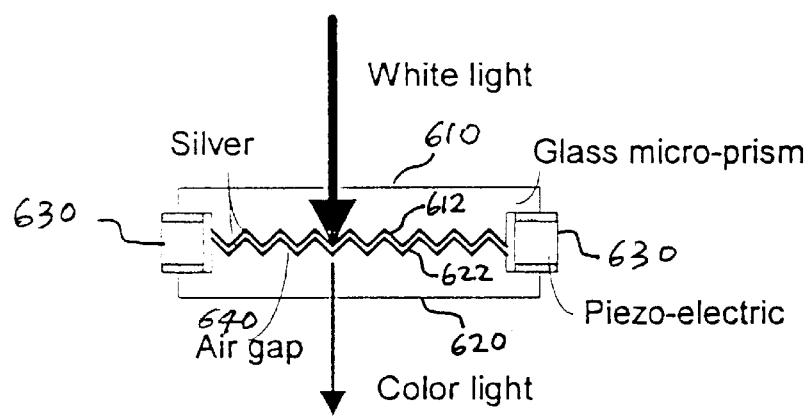
FIG. 6 is diagram showing a surface plasmon filter formed with two glass plates having micro-prisms arrays.

The filter configuration shown in FIG. 4 can be used to form a tunable color filter array by using two micro-prism plates. An example is shown in FIG. 6. Two "T" shaped glass plates 610 and 620 each have a plurality of micro-prisms 612 and 622 arranged in a one-dimensional or two-dimensional prism array on one side of the plates. The micro-prisms 612 and 622 may be formed by etching or other microprocessing techniques. A thin metal film layer is coated on the micro-prisms on each glass plate. The filter 600 is formed by placing the two glass plates 610 and 620 together with the micro-prism sides conforming with each other. Two adjustable spacers 630 (e.g., voltage-controlled piezo-electric spacers) are used to separate the two glass plates 610 and 620 by a thin air gap 640 between the micro-prisms 612 and 622. Preferably, the thin air gap 640 is less than a wavelength. As the length of the spacers 630 is adjusted, the air gap 640 between the micro-prisms 612 and 622 changes. This results in a change in the surface plasmon resonance frequency and consequently a shift in the wavelength of the transmission spectrum.

Figure 7:
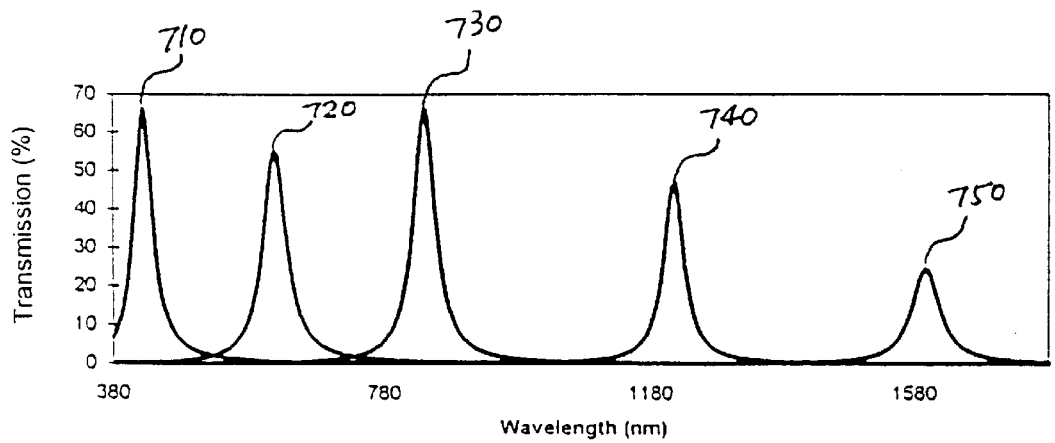
FIG. 7 is a chart of calculated transmission spectrum of the surface plasmon filter of FIG. 6 under different spacings of the air gap between the glass plates.

FIG. 7 shows the calculated transmission of the device of FIG. 6 as a function of wavelength for various spacings of the air gap 640. The calculation is based on silver films of 40 nm thick, an incident angle of 42.5°, and coupling prisms made of the BK7 glass. When the air gap 640 increases form 300 nm to 5000 nm, the peak reflectivity shifts from 400 nm to 1600 nm. The transmission peaks as labeled are: peak 710 at an air gap of 300 nm, peak 720 at an air gap of 800 nm, peak 730 at an air gap of 1500 nm, peak 740 at an air gap of 3000 nm, and peak 750 at an air gap of 5000 nm.

The air gap surface plasmon tunable filter shown in FIGS. 4 and 6 can be operated under a wide range of temperature. For example, an operating temperature range from about −200° C. to +200° C. can be achieved by using piezo-electric spacers and choosing the prism glass to match the thermal expansion of the piezo-electric spacers.

Alternatively, the air gap 640 in the micro-prism surface plasmon filter 600 of FIG. 6 may be replaced by a layer of electro-optic material with a fixed thickness. The surface plasmon resonant frequency can be altered by electrically changing the index of refraction.

Figure 8B:
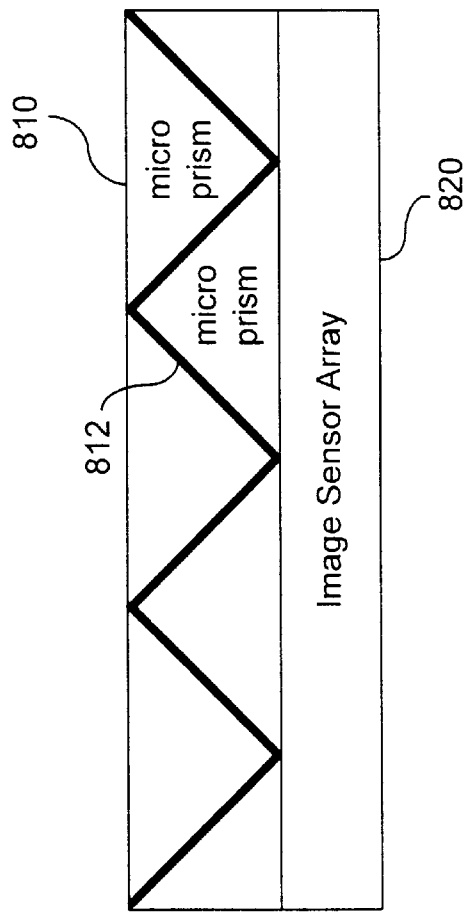
FIG. 8B is a diagram illustrating integration of a surface plasmon filter and a sensor array.
Figure 8A:
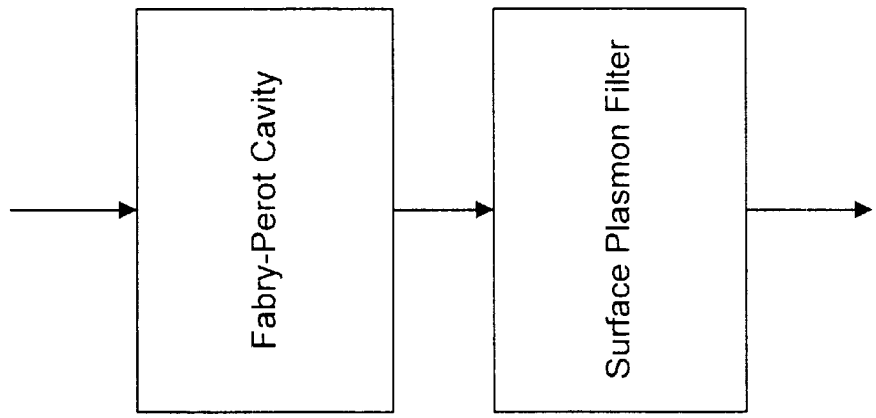
FIG. 8A is a block diagram showing a high-resolution spectrometer based on a Fabry-Perot filter and a surface plasmon filter.

The above-described surface plasmon tunable filters may combine with a Fabry-Perot filter to form a high-resolution spectrometer as shown in FIG. 8A. Fabry-Perot filters can be made to have a high fineness number to achieve high spectral resolution. However, the tuning range of many Fabry-Perot filters is limited. The spectrometer of FIG. 8A has an advantage of the high resolution of the Fabry-Perot filter and the wide tunable range of the surface plasmon filter.

FIG. 8B shows another device based on the surface plasmon filter. This device combines the micro-prism surface plasmon filter 810 with a sensor array 820. The micro-prism surface plasmon filter 810 has an active layer 812 which can be either an air gap or a layer of electro-optic material between two metallic films. The sensor array 820 may be any photodetector array including a CCD array, a diode array, a phototransistor array or an active pixel sensing array ("APS"). In operation, the surface plasmon filter 810 selects the transmission spectrum and the sensor array 820 measures the intensity of the incident pattern, respectively. As shown in FIG. 8A, a Fabry-Perot filter may be added to the device of FIG. 8B to enhance the spectral resolution.

In addition, the device of FIG. 8B may be integrated on a single chip to form an image spectrometer-on-a-chip. In particular, an APS array may be used as the sensor array and the active layer 812 of the surface plasmon filter may be divided into many pixels to match the pixel size of the APS array. The pixel of the active layer 812 can be addressed by an active matrix and the spectrum of each pixel can be individually adjusted.

Figure 9:
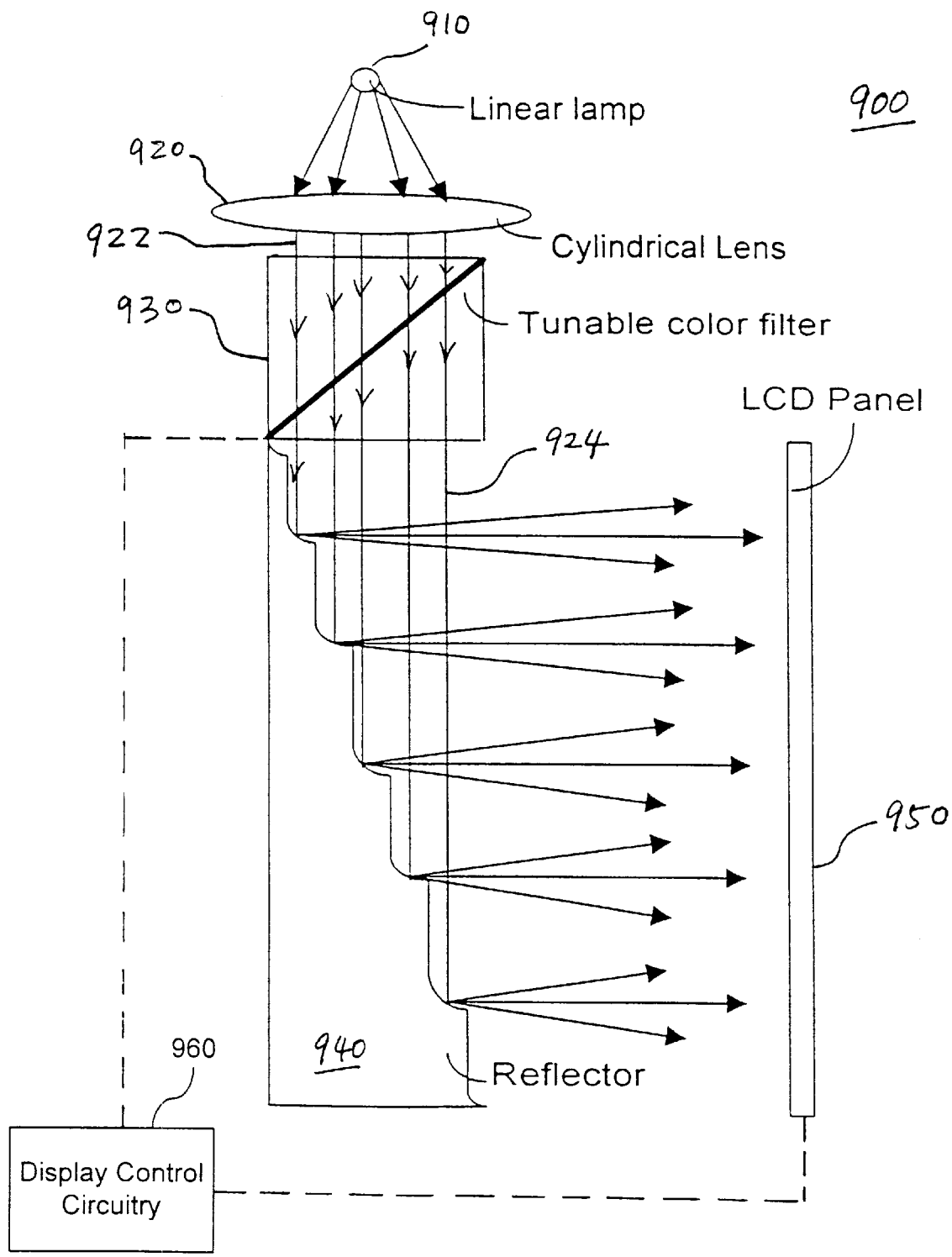
FIG. 9 is a diagram of color LCD display based on a surface plasmon filter.

Furthermore, a surface plasmon filter can be used in either a projection or a direct-view color display system. FIG. 9 shows a back-lit color liquid crystal display ("LCD") system 900 based on a prism-coupled surface plasmon filter 930. A light source 910 and a lens system 920 produce a white beam 922 with a substantially homogenous illumination profile. The light source 910 may be a lamp with a line-shaped filament and the lens system 920 may simply be a cylindrical lens. The surface plasmon filter 930 receives the white beam 922 and produces a beam 924. The color of the beam 924 is electrically controlled by the filter 930 using either an adjustable air gap or an electro-optic material. A reflector 940 further guides the filtered beam 924 to a monochromatic LCD panel 950. Preferably, the reflective surface of the reflector 940 has structures to make the reflected light diffusive in order to improve the homogeneity of the images.

The filter 930 is configured to operate in the visible spectral range from about 400 nm to about 750 nm. For example, the prisms may be made of $TiO_2$ and the metallic films may be made of silver. In addition, an electro-optic material with an index variation range of about 0.5 may be used to achieve all three additive primary colors (i.e., red, green and blue). FIG. 3A shows one possible spectral output of such a filter.

The filter 930 and the LCD panel 950 are controlled by a display control circuit 960. The filter 930 performs color filtering in the homogeneous illumination beam 924 and the LCD panel 950 modulates the intensity distribution of the beam 924 to form images. During each frame scanning in the LCD panel 950 (e.g., 60 frame scans per second), the control circuit 960 controls the filter 930 to change the color of the beam 934 three times by sequentially hopping through three primary colors. This process produces colored images. In many LCD color displays, three pixels are used to produce one image pixel and each pixel has a color filter to produce one of the three primary colors. Thus, the LCD display 900 of FIG. 9 eliminates the color filter in each pixel and can achieve the same resolution in the color images by using only one third of the active pixels in the conventional LCD color displays. In addition, the LCD display 900 can be used to achieve higher image resolution with the same number of active pixels in the LCD panel 950 as in a conventional LCD display.

Although the present invention has been described in detail with reference to the preferred embodiments, one ordinarily skilled in the art to which this invention pertains will appreciate that various modifications and enhancements may be made. For example, the coupling prisms, e.g., prisms 230a and 230b, may be made with angles other than an apex angle of 90° as illustrated; a polarizing element may be disposed in the path of the incident beam to change the input polarization to the p-polarization; the surface plasmon filter 930 in the LCD display may be grating coupled or have a micro-prism configuration; the LCD panel 950 may a digital mirror array. In addition, the air gaps may be a gap with a gas other than the air.

Furthermore, although all the embodiments disclosed change either the thickness or the index of refraction of the center dielectric layer to tune the transmission wavelength, the incident angle of the input light may also be adjusted to change the surface plasmon resonance condition, thereby changing the transmission wavelength. The incident angle may be changed with an angle adjustment device by either adjusting the direction of the input beam or adjusting the orientation of the surface plasmon filter relative to the input beam. In implementation of such angular tuning scheme, the index of refraction and the spacing between the two metal-dielectric interfaces may be fixed so that the incident angle is the only tuning parameter. Alternatively, the incident angle and either or both of the index of refraction and the spacing between the two metal-dielectric interfaces may be adjusted to tune the transmission wavelength.

These and other variations and modifications are intended to be encompassed by the appended claims.

What is claimed is:

1. An optical filter, comprising:
    a dielectric layer having a first side and an opposite second side and comprising a first dielectric material with a first dielectric constant and a first predetermined thickness; and
    first and second metallic films each having a second dielectric constant and a second predetermined thickness, said metallic films respectively formed on the opposite sides of said dielectric layer to form first and second metal-dielectric interfaces which are substantially symmetric with respect to said dielectric layer,
    wherein said dielectric layer, said first and second metallic films are configured to support first and second surface plasmon modes, respectively, at said first and second metal-dielectric interfaces and said dielectric layer is configured to transfer a selected spectral component in a p-polarized input electromagnetic wave from said first side of said dielectric layer to said second side by coupling said first and second surface plasmon modes.

2. The optical filter as in claim 1, further comprising:
    a first coupling element, formed on said first metallic film and configured to couple the p-polarized input electromagnetic wave into said first surface plasmon mode at said fist metal-dielectric interface; and
    a second coupling element formed on said second metallic film and configured to couple the energy of said selected spectral component to an output electromagnetic wave.

3. The optical filter as in claim 2, wherein said first and second coupling elements comprise prisms which are made of a dielectric material having a dielectric constant higher than said first dielectric constant of said dielectric layer.

4. The optical filter as in claim 2, wherein said first and second coupling elements comprise diffraction gratings.

5. The optical filter as in claim 1, wherein said first dielectric material of said dielectric layer includes an electro-optic material whose index of refraction is controllable in response to a voltage control signal to change the wavelength of said selected spectral component, thereby changing a wavelength of an output electromagnettc wave.

6. The optical filter as in claim 2, wherein said dielectric layer includes an air gap and further comprising at least one adjustable spacer disposed between said first and second coupling elements to change the wavelength of said selected spectral component, thereby changing a wavelength of an output electromagnetic wave.

7. The optical filter as in claim 1, wherein said first predetermined thickness of said dielectric layer is on the order of one wavelength of an input optical wave.

8. The optical filter as in claim 1, wherein said second predetermined thickness of said first and second metallic films is from 5 nm to 150 nm.

9. The optical filter as in claim 1, further comprising an angle adjustment device operable to change the incident angle of the input p-polarized electromagnetic wave with respect to said first metal-dielectric interface to tune the wavelength of said selected spectral component.

10. The optical filter as in claim 1, wherein said first dielectric constant is positive and said second dielectric constant is negative.

11. An optical filter, comprising:
    a first coupling element having a first coupling surface and operable to couple a p-polarized input electromagnetic wave to have a propagation component parallel to said coupling surface;
    a first metallic film formed on said first coupling surface and operable to produce free electron oscillations in response to excitation of said p-polarized input electromagnetic wave;
    a second coupling element configured to have a second coupling surface and disposed relative to said first coupling element so that said second coupling surface opposes and is spaced from said first coupling surface, said second coupling element operable to couple an electromagnetic wave propagating along said second coupling surface into an output electromagnetic wave;
    a second metallic film formed on said second coupling surface of said second coupling element and operable to produce free electron oscillations in response to excitation of said p-polarized input electromagnetic wave; and
    a dielectric material disposed between said first and second metallic films to respectively form first and second metal-dielectric interfaces which are configured to respectively support first and second surface plasmon modes at said first and second metal-dielectric interfaces and to transfer a selected spectral component in said p-polarized input electromagnetic wave from said first coupling surface to said second coupling surface by coupling said first and second surface plasmon modes.

12. The optical filter as in claim 11, wherein said dielectric material is an electro-optic material and further comprising a voltage supply connected to said first and second metalltc films to apply a control voltage, wherein the index of refraction of said electro-optic material changes in response to said control voltage to change the wavelength of said selected spectral component.

13. The optical filter as in claim 11, wherein said dielectric material is a gaseous medium and the spacing between said first and second coupling surfaces is variable in order to change the wavelength of said selected spectral component.

14. The optical filter as in claim 12 or claim 13, wherein said first and second coupling elements each comprise a prism having an index of refraction larger than said dielectric material.

15. The optical filter as in claim 12 or claim 13, wherein said first and second coupling elements each comprise a dielectric plate that has an index of refraction larger than said dielectric material and has a plurality of micro-prisms.

16. The optical filter as in claim 12 or claim 13, wherein said first and second coupling elements each comprise a diffraction grating.

17. The optical filter as in claim 11, further comprising an image sensor array that has a plurality of photo sensing elements, said image sensor array disposed relative to said second coupling element to receive said output electromagnetic wave.

18. The optical filter as in claim 11, further comprising a Fabry-Perot filter that is disposed relative to said first coupling element to produce said p-polarized input electromagnetic wave to said first coupling surface.

19. The optical filter as in claim 11, further comprising:
- a liquid crystal display panel disposed relative to said second coupling element to receive and modulate said output electromagnetic wave in order to imprint an image; and
- a display control circuit connected to said liquid crystal display panel to control the modulation of said output electromagnetic wave from said second coupling element and configured to control the wavelength of said selected spectral component that is coupled from said first coupling surface to said second coupling surface, wherein said image imprinted on said output electromagnetic wave is in color.

20. A method for filtering light, comprising:
- forming a first metal-dielectric interface which is configured to support a first surface plasmon mode and a second metal-dielectric interface which is configured to support a second surface plasmon mode;
- providing a coupling mechanism to couple said first and second surface plasmon modes to transfer electromagnetic energy between said first and second metal-dielectric interfaces; and
- coupling an input electromagnetic wave to said first and second metal-dielectric interfaces to select a specified spectral component in resonance with said first and second surface plasmon modes so that said spectral component is transferred from one side of said first and second metal-dielectric interfaces to the other side to produce a transmitted output electromagnetic wave at the wavelength of said specified spectral component.

\* \* \* \* \*